United States Patent [19]
Ono

[11] Patent Number: 6,106,083
[45] Date of Patent: Aug. 22, 2000

[54] RUBBER CRAWLER

[75] Inventor: Yoshihiko Ono, Yokohama, Japan

[73] Assignee: Bridgestone Corporation, Tokyo, Japan

[21] Appl. No.: 09/129,225

[22] Filed: Aug. 5, 1998

[30] Foreign Application Priority Data

| Aug. 6, 1997 | [JP] | Japan | 9-225871 |
| Oct. 14, 1997 | [JP] | Japan | 9-296387 |

[51] Int. Cl.[7] .................................................. B52D 55/24
[52] U.S. Cl. ........................................ 305/171; 305/177
[58] Field of Search .................................. 305/165, 167, 305/170, 171, 173, 174, 175, 177

[56] References Cited

FOREIGN PATENT DOCUMENTS

| 493875 A1 | 7/1992 | European Pat. Off. . | |
| 55-19683 | 2/1980 | Japan | 305/177 |
| 56-142763 | 11/1981 | Japan | 305/177 |
| 58-93679 | 6/1983 | Japan | 305/171 |
| 58-152682 | 9/1983 | Japan | 305/174 |
| 3-239682 | 10/1991 | Japan | 305/174 |
| 99/12799 | 3/1999 | WIPO . | |

OTHER PUBLICATIONS

Patent Abstracts of Japan, V16, N214 (M–125), May 20, 1992 (JP 4–039180).
Patent Abstracts of Japan, V7, N169 (M–231), Jul. 26, 1983 (JP 58–073483).

*Primary Examiner*—Russell D. Stormer
*Attorney, Agent, or Firm*—Sughrue, Mion, Zinn Macpeak & Seas, PLLC

[57] ABSTRACT

A rubber crawler has a rubbery elastomer constituting a main body of the crawler. At least one metal core is buried in the rubbery elastomer and extending in a widthwise direction perpendicular to a running direction of the crawler. At least one rubber lug is formed on an outer peripheral face of the rubber elastomer. A specified configuration is applied to each widthwise end of the metal core to improve the durable life of the crawler.

7 Claims, 13 Drawing Sheets

FIG_1
PRIOR ART

FIG_2
PRIOR ART

FIG_5

FIG_6

FIG_9

FIG_10

FIG_15

FIG_16

RUBBER CRAWLER

BACKGROUND OF THE INVENTION

1. Field of the Invention

This invention relates to a novel rubber crawler, and more particularly to a rubber crawler having a structure for preventing the occurrence of crack or breakage in each of widthwise edge portions of rubber in the crawler.

2. Description of Related Art

Figure 1:
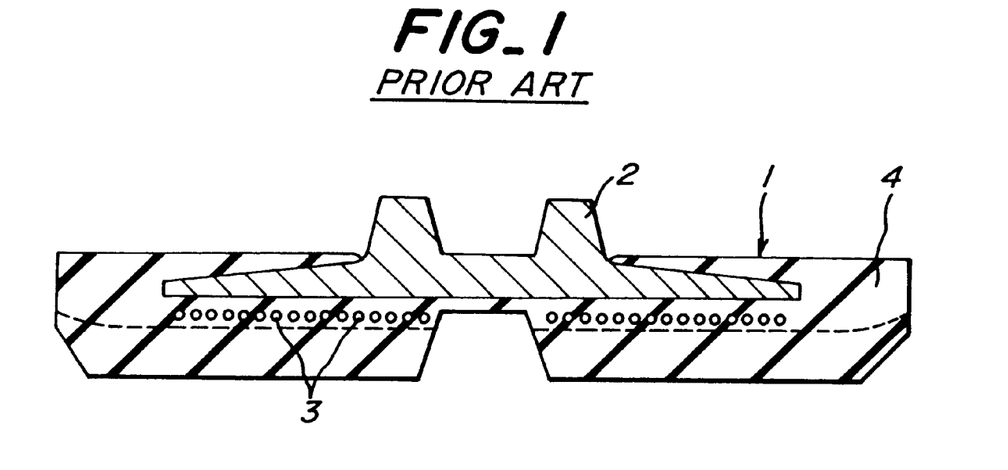
FIG. 1 is a diagrammatically section view of an embodiment of the conventional rubber crawler.
Figure 2:
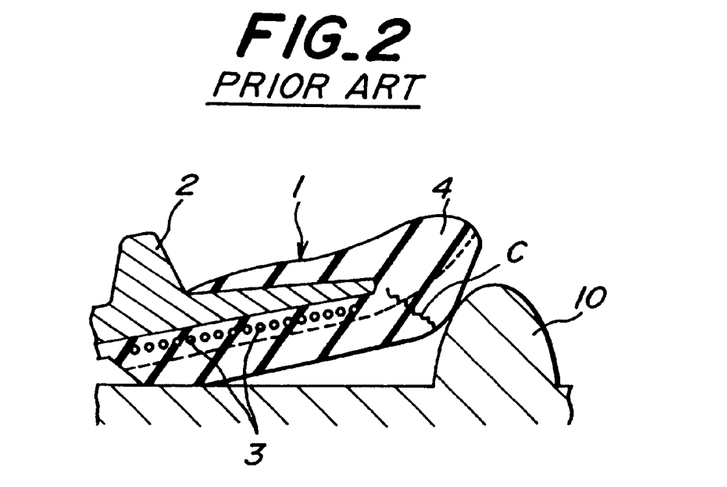
FIG. 2 is a partial section view illustrating a state of riding the conventional rubber crawler on a curb of a footpath to cause cracking.

There are well-known and widely used rubber crawlers having structures shown in FIG. 1. This rubber crawler shown in FIG. 1 comprises an endless rubber belt 1, a plurality of core metal pieces 2 arranged and buried at predetermined intervals in the longitudinal direction of the belt 1, and steel cords 3 arranged to cover the outer surface of the metal pieces 2 and buried in the longitudinal direction of the belt 1. Since a widthwise length of the metal piece 2 is shorter than a full width of the belt 1, widthwise edge portions 4 made from only rubber are formed in both sides of the belt 1.

Figure 3:
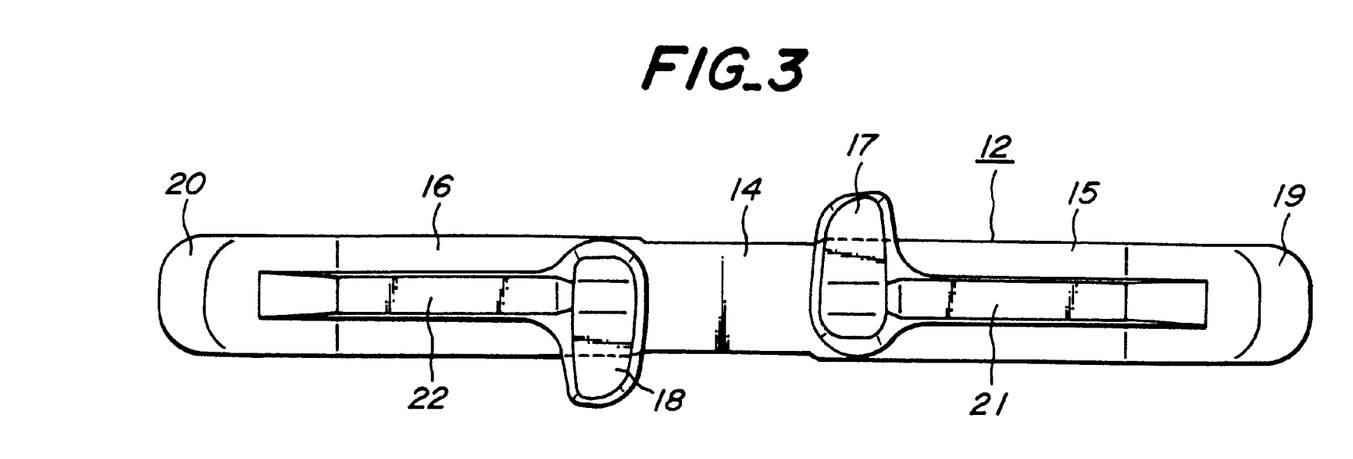
FIG. 3 is a plan view of a first embodiment of the metal core used in the rubber crawler according to the invention.

In general, the widthwise edge portion of the core metal piece has a vertically cut shape at its widthwise edge and front and back edges and is most rich in the flexibility as a whole of the rubber crawler. Therefore deformation strain is liable to be most caused in the widthwise edge portion at a use state of the rubber crawler. For example, when the rubber crawler contacts with or rides on protrusions such as pebbles, stone pieces, and the like scattered on a running road or a curb of a footpath as shown in FIG. 3, the widthwise edge portion 4 is sandwiched between the core metal piece 2 and the curb 10 and shearing force strongly and repeatedly acts to the widthwise edge of the core metal piece during the running of the rubber crawler to thereby create crack C from the vicinity of such an edge toward an outer surface of the widthwise edge portion 4. Such a crack grows toward the side of contacting with ground and further toward the front and back sides of the widthwise edge portion due to repetition of deformation stress to finally cause the breakage of the widthwise edge portion. As a result, the durability of rubber constituting the widthwise edge portion and hence service life of the rubber crawler are undesirably degraded.

SUMMARY OF THE INVENTION

It is, therefore, an object of the invention to solve the aforementioned problem of the conventional rubber crawler and to provide a novel rubber crawler capable of reducing or preventing the occurrence of cracks or breakage in the widthwise edge portions of rubber due to the contacting with or riding on the protrusion scattered on road or the curb of the footpath.

According to a first aspect of the invention, there is the provision of a rubber crawler comprising a rubbery elastomer constituting a main body of the crawler, at least one metal core buried in the rubbery elastomer and extending in a widthwise direction perpendicular to a running direction of the crawler, and at least one rubber lug formed on an outer peripheral face of the rubber elastomer, wherein a rib having a round shape at section is formed in each widthwise end of the metal core.

According to a second aspect of the invention, there is the provision of a rubber crawler comprising a rubbery elastomer constituting a main body of the crawler, at least one metal core buried in the rubbery elastomer and extending in a widthwise direction perpendicular to a running direction of the crawler, and at least one rubber lug formed on an outer peripheral face of the rubber elastomer, wherein a bent portion directing toward an inner peripheral side of the crawler so as to separate away from a ground contact face of the rubber lug is formed in each widthwise end of the metal core.

In a preferable embodiment of the second aspect, an inclination angle α of the bent portion with respect to an outer horizontal peripheral face of the metal core is 15–45°, preferably 20–35°. When the inclination angle α is less than 15°, the effect of preventing the bending deformation of the widthwise side portion is less, while when it exceeds 45°, the interference to a driving wheel in the crawler is liable to be undesirably caused.

In another preferable embodiment of the second aspect, the bent portion is provided with an outside-inside path.

In the other preferable embodiment of the invention, when the rubber elasotmer is an endless rubber belt, a row of plural steel cords arranged side by side is buried in the rubber elastomer along an outer surface of the metal core so as to extend these steel cords in the circumferential direction of the rubber elastomer and each of outermost steel cords in the steel cord row is located inward from the widthwise end of the metal core by not less than 15 mm.

In a further preferable embodiment of the invention, an edge of a plane surface in a widthwise end portion of the rubber elastomer facing to ground is located outward from an outer surface of the metal core.

BRIEF DESCRIPTION OF THE DRAWINGS

The invention will be described with reference to the accompanying drawings, wherein.

DESCRIPTION OF PREFERRED EMBODIMENTS

Figure 4:
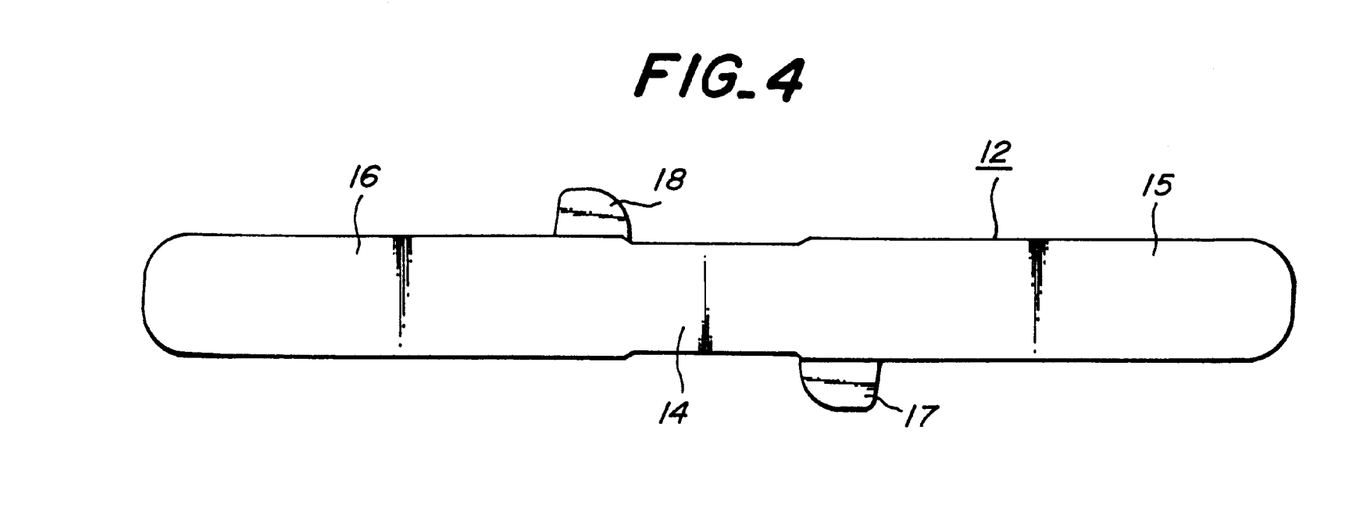
FIG. 4 is a bottom view of the first embodiment of the metal core.
Figure 5:
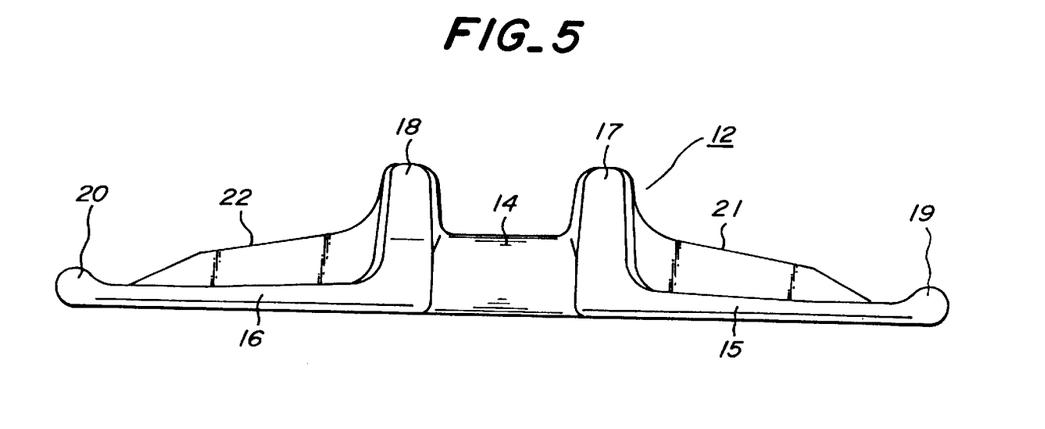
FIG. 5 is a front view of the first embodiment of the metal core.
Figure 6:
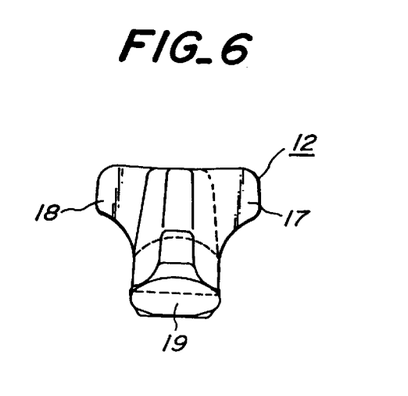
FIG. 6 is a right side view of the first embodiment of the metal core.

A first embodiment (12) of the metal core used in the rubber crawler according to the invention is shown as a plan view in FIG. 3, as a bottom view in FIG. 4, as a front view in FIG. 5 and as a right side view in FIG. 6, respectively.

In the metal core 12, numeral 14 is a portion engaging with a sprocket (not shown) and wing portions 15, 16 are formed on both sides of the sprocket engaging portion 14 and also a pair of projections 17, 18 sandwiching the sprocket engaging portion 14 are arranged in zigzag. Also, ribs 19, 20 having a round shape at section are formed in longitudinal ends of the wing portions 17, 18, respectively. Preferably, the ribs 19, 20 are formed at a side of directing toward an inner peripheral side of a rubber crawler. Moreover, numerals 21, 22 are ribs formed on the wing portions 15, 16 from the vicinity of the longitudinal end thereof toward the projections 17, 18, respectively.

As a concrete example, the metal core 12 has a longitudinal length of 290 mm and a width of 30 mm, and the sprocket engaging portion 14 has a distance between the projections 17, 18 of 46 mm and a height from the bottom of 27 mm, and the length of each of the wing portions 15, 16 is 122 mm. The thickness in the vicinity of longitudinal end of the wing portion 15, 16 is about 37 mm, and each of the ribs 19, 20 has a radius of 6 mm. each of the projections 17, 18 has a width at its top of 15 mm and a height from the bottom of 50 mm.

Figure 7:
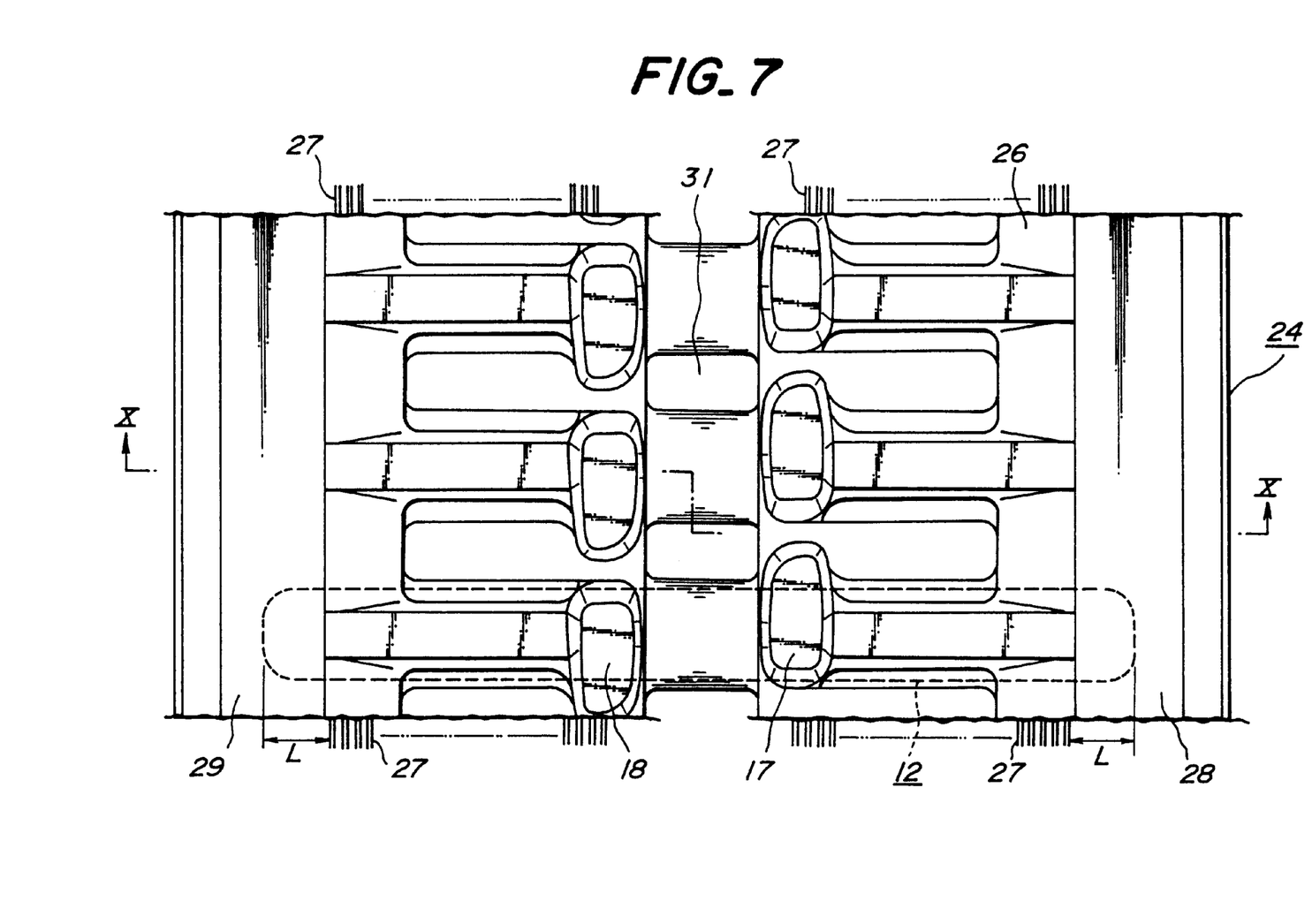
FIG. 7 is view of a first embodiment of the rubber crawler according to the invention using the first embodiment of the metal core.
Figure 8:
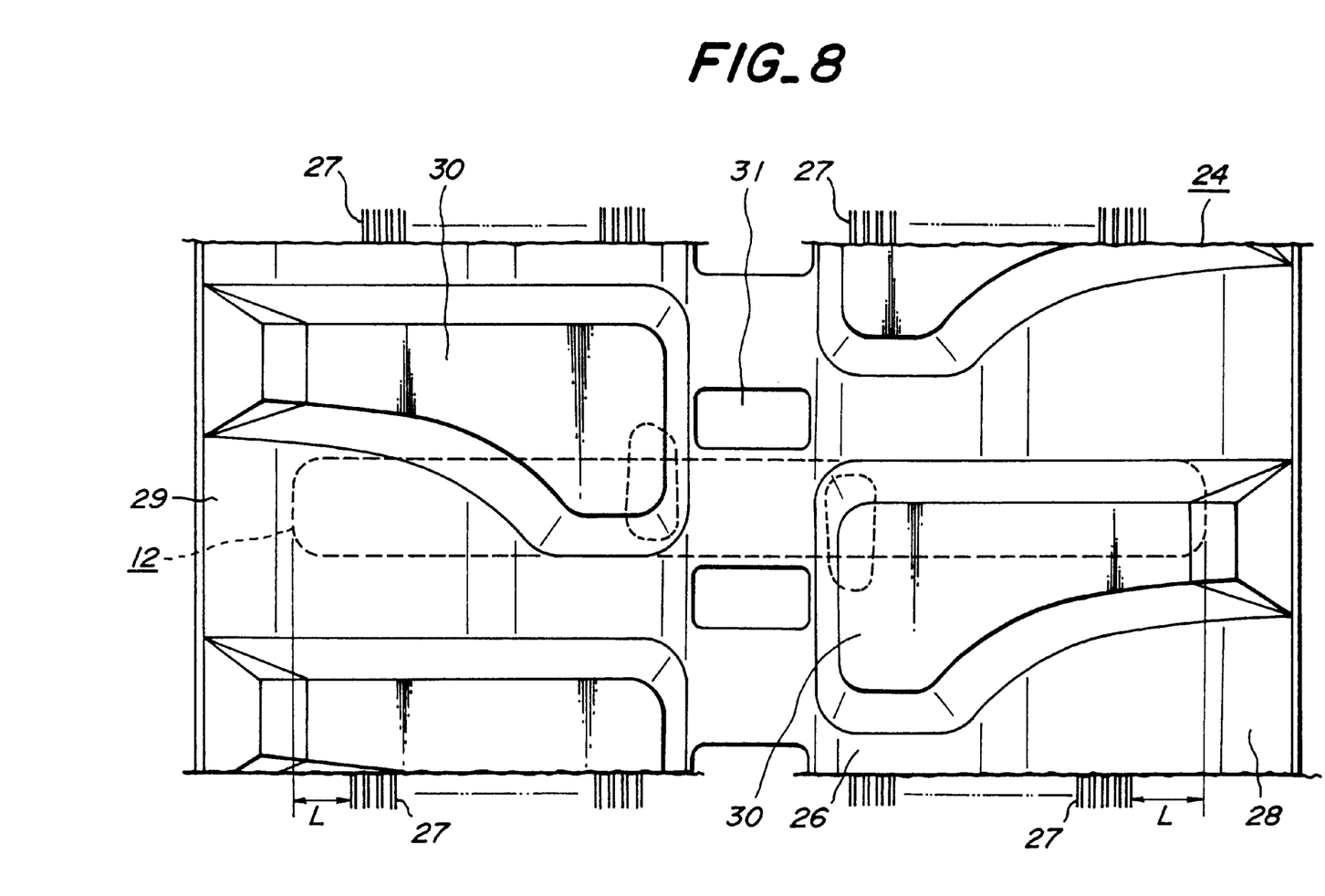
FIG. 8 is a bottom view of the first embodiment of the rubber crawler.
Figure 9:
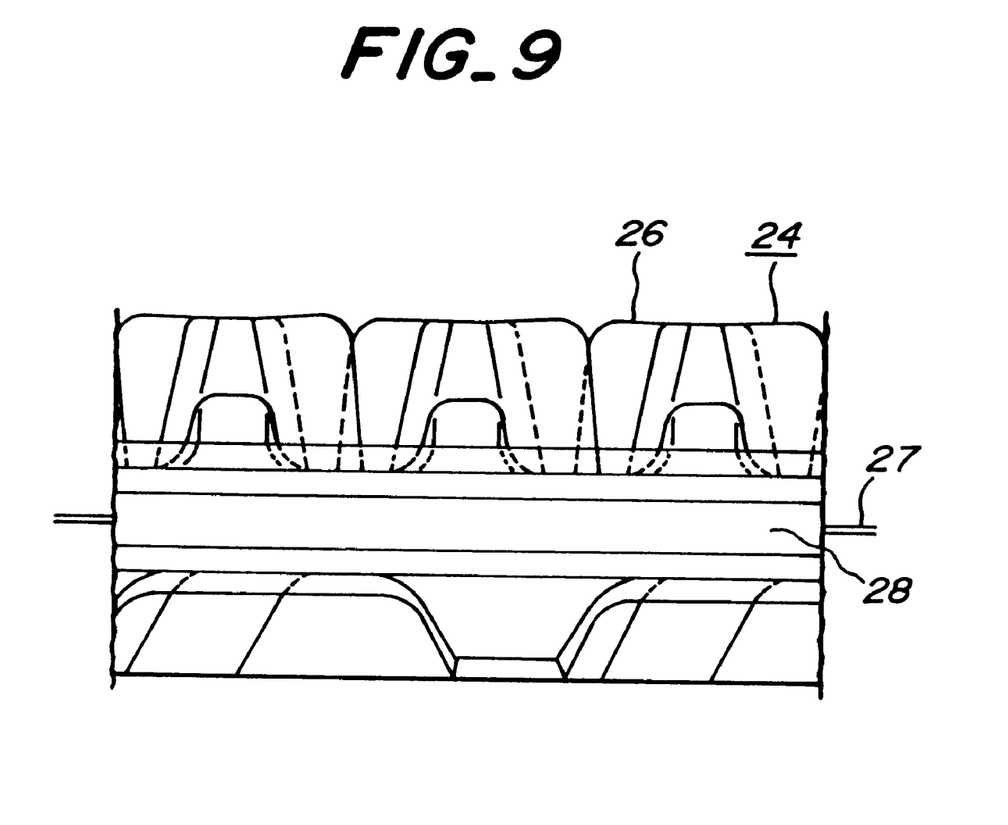
FIG. 9 is a right side view of the first embodiment of the rubber crawler.
Figure 10:
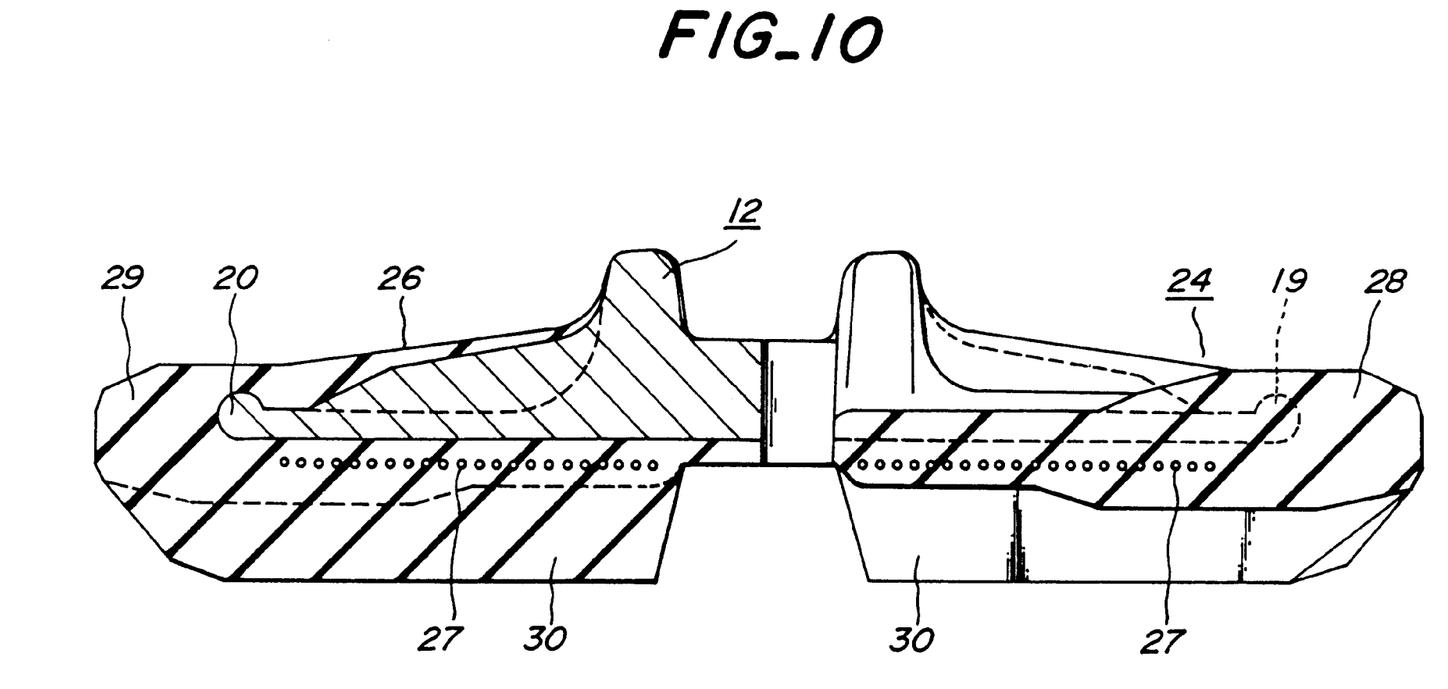
FIG. 10 is a section view of the first embodiment of the rubber crawler taken along a line X—X of FIG. 9.

A first embodiment (24) of the rubber crawler according to the invention using the metal core 12 shown in FIGS. 3–6 is shown as a plan view in FIG. 7, as a bottom view in FIG. 8, as a right side view in FIG. 9 and as a section view in FIG. 10, respectively.

In the rubber crawler 24, numeral 26 is an endless rubber elastomer buried with a plurality of the metal cores 12 at a given pitch in the longitudinal direction thereof. A row of steel cords 27 arranged side by side are buried in the rubber elastomer 26 along a bottom surface of the wing portions 15, 16 of the metal core 12 in the longitudinal direction of the rubber elastomer 26. Therefore, widthwise end portions 28, 29 made of only rubber are formed outward from both ends of the metal core 12 in the rubber elastomer 26. Moreover, numeral 30 is a rubber lug formed on the outer peripheral surface of the rubber elastomer 26 at a side of contacting with ground and numeral 31 is a sprocket hole defined between the sprocket engaging portions of the adjacent metal cores 12 in which sprocket teeth (not shown) of a driving wheel (not shown) bite in.

As shown in FIG. 10, rubber constituting the widthwise end portions 28, 29 is adhered to the ribs 19, 20 formed in the longitudinal ends of the metal core 12, so that the adhesion area is widened to increase the adhesion strength. Further, when the rubber crawler 24 contacts with or rides on a curb of a footpath or the like, shearing force does not concentrate in rubber of the widthwise end portion 28, 29 owing to the presence of the ribs 19, 20 and hence the occurrence of crack in the widthwise end portion 28, 29 is reduced to prevent the breakage of the widthwise end portion 28, 29.

Furthermore, each of outermost steel cords 27 in the steel cord row is located inward from the longitudinal end of the wing portions 15, 16 of the metal core 12 by a given distance L of not less than 15 mm. Even if the crack is caused in the vicinity of the rib 19, 20, it does not arrive at the outermost steel cord 27 in the steel cord row and hence the growth of the crack in the longitudinal direction of the rubber crawler is not caused.

Figure 11:
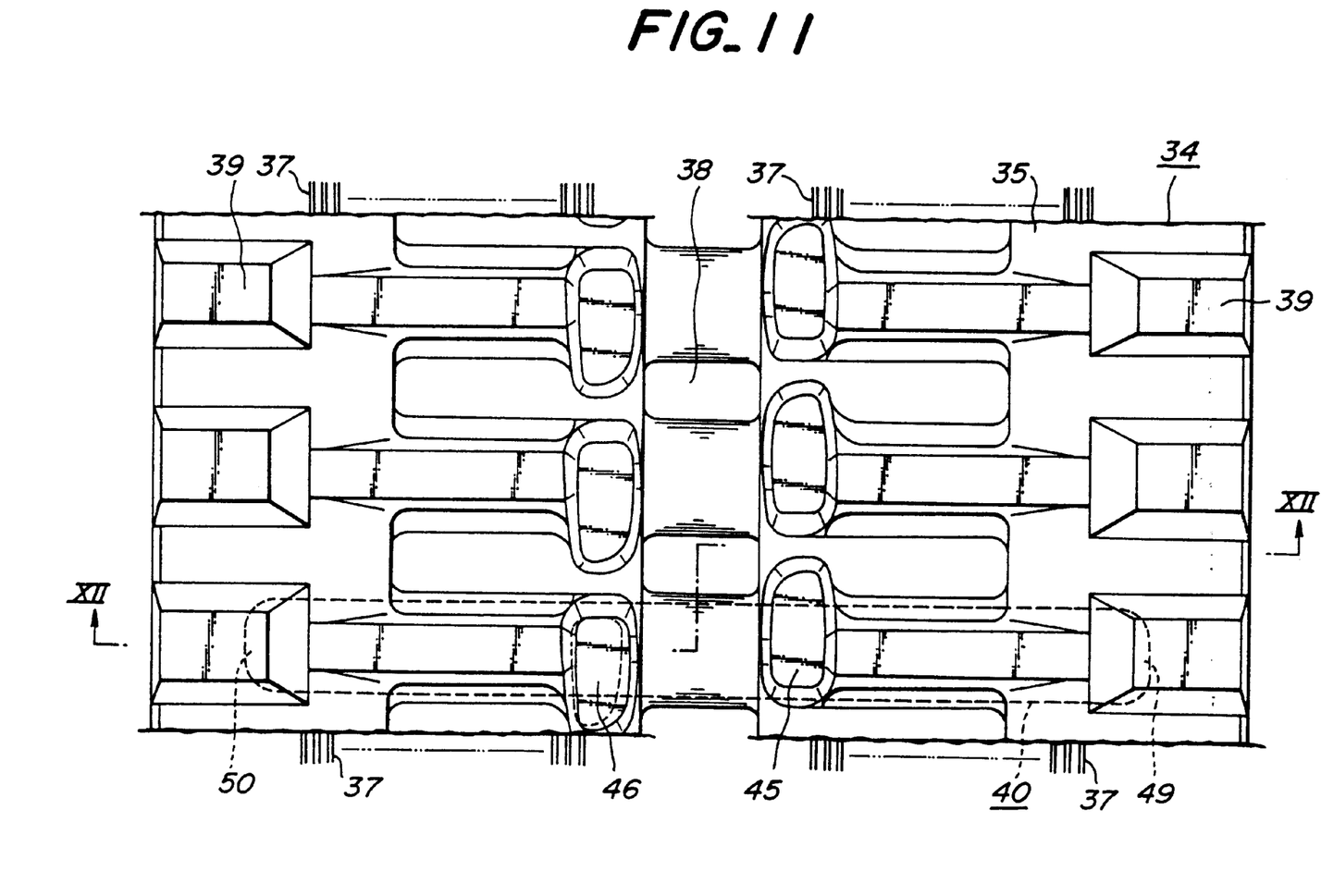
FIG. 11 is a plan view of a second embodiment of the rubber crawler according to the invention.
Figure 12:
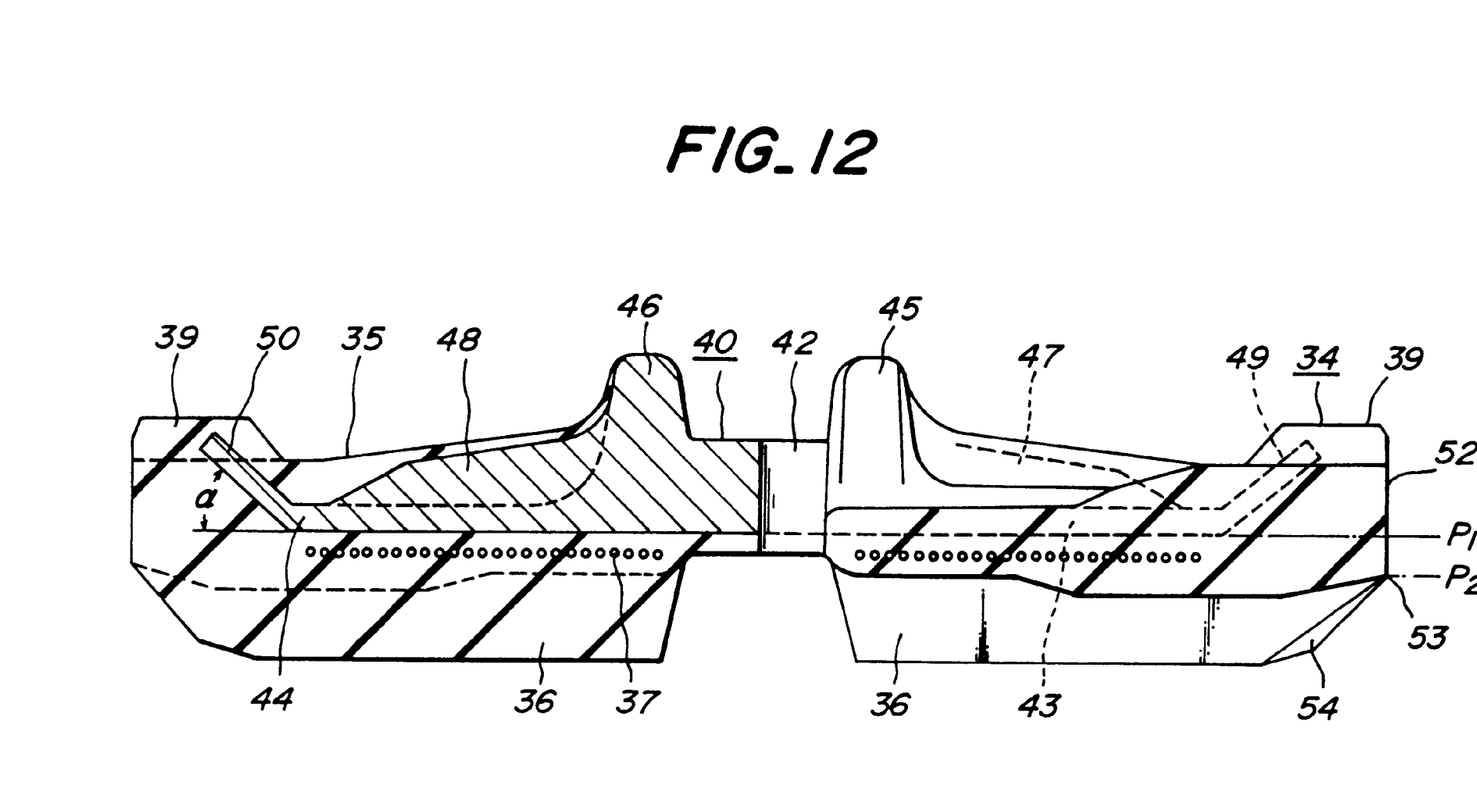
FIG. 12 is a section view of the second embodiment of the rubber crawler taken along a line XII—XII of FIG. 11.

A second embodiment (34) of the rubber crawler according to the invention is shown as a plan view in FIG. 11 and as a section view in FIG. 12. A second embodiment (40) of the metal core used in the rubber crawler 34 comprises a sprocket engaging portion 42, a pair of wing portions 43, 44 formed on both sides thereof, a pair of projections 45, 46 sandwiching the sprocket engaging portion 42, ribs 47, 48 formed on the wing portions 43, 44 toward the projections 45, 46 and bent portions 49, 50 formed by bending longitudinal ends of the wing portions 43, 44 to direct toward an inner peripheral side of the rubber crawler 34.

In the rubber crawler 34, numeral 35 is an endless rubber elastomer buried with a plurality of the metal cores 40 at a given pitch in the longitudinal direction thereof, numeral 36 is a rubber lug rubber lug formed on the outer peripheral surface of the rubber elastomer 35 at a side of contacting with ground, numeral 37 is steel cords arranged side by side in a row and buried in the rubber elastomer 35 along a bottom surface of the wing portions 43, 44 of the metal core 40 in the longitudinal direction of the rubber elastomer 35, and numeral 38 is a sprocket hole defined between the sprocket engaging portions of the adjacent metal cores 40 in which sprocket teeth (not shown) of a driving wheel (not shown) bite in.

When the metal core 40 is buried in the rubber elastomer 35, since the bent portions 49, 50 are formed in both ends of the metal core 40, a thickening portion 39 is formed in a widthwise and inner end portion of the rubber elastomer 35 so as to cover the bent portion 49, 50. Also, an edge 53 of a flat end face 52 of the rubber elastomer 35 in the widthwise direction thereof is located ($P_2$) outward from a horizontal position $P_1$ of an outer peripheral face of the metal core 40, whereby the rubber thickness in the widthwise end portion of the rubber elastomer is increased to separate away a position of crack concentration from the widthwise end of the metal core 40 in the widthwise end portion of the rubber elastomer 35. Moreover, numeral 54 is a slant face at the widthwise end of the rubber lug 36.

As shown in FIG. 12, the inclination angle α of the bent portion 50 with respect to the outer horizontal face of the metal core 40 is about 30°.

Figure 13:
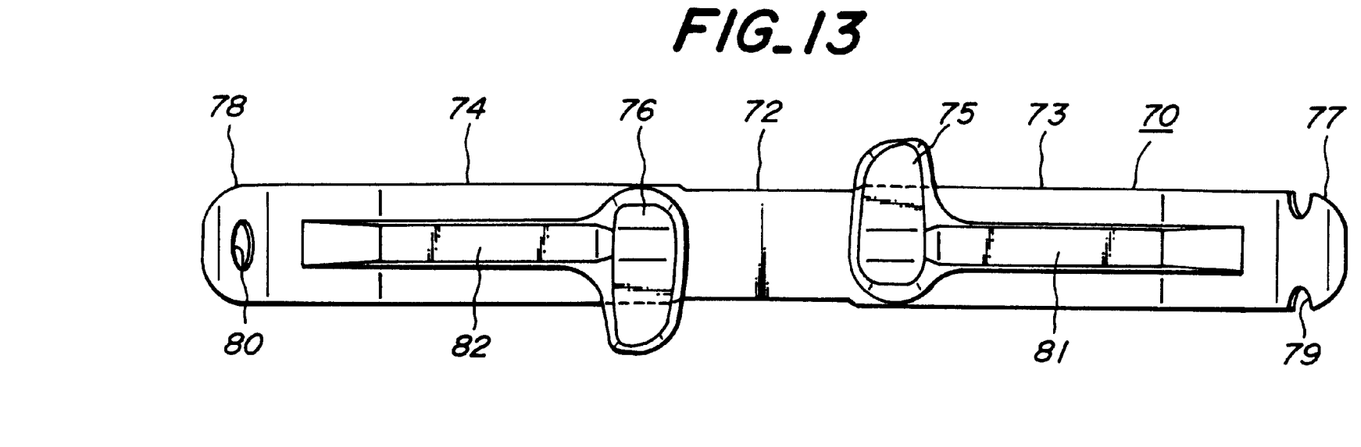
FIG. 13 is a plan view of a third embodiment of the metal core used in the rubber crawler according to the invention.
Figure 14:
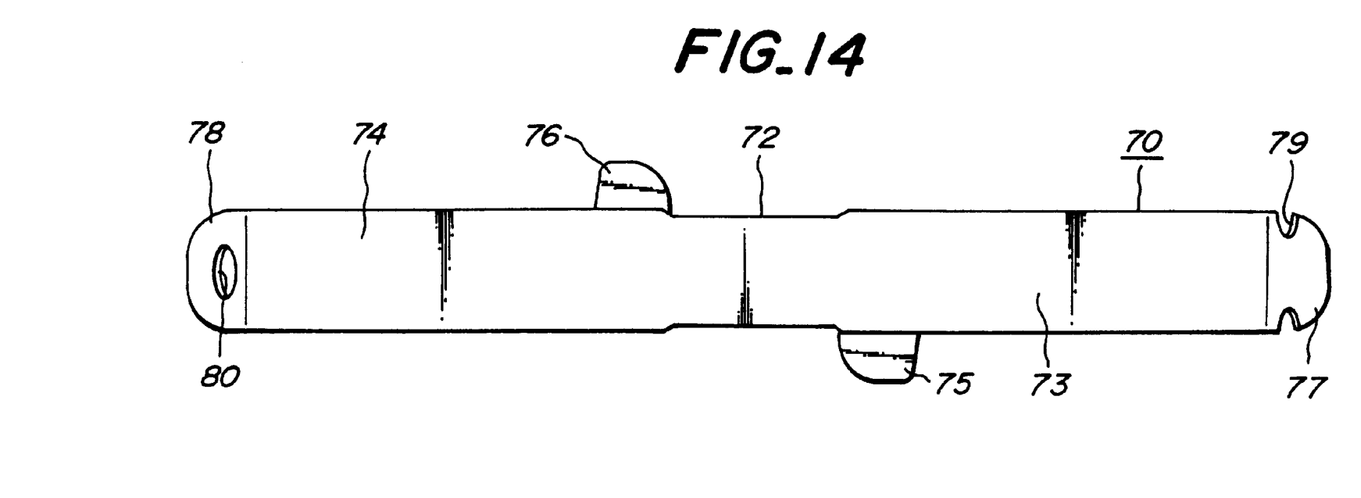
FIG. 14 is a bottom view of the third embodiment of the metal core.
Figure 15:
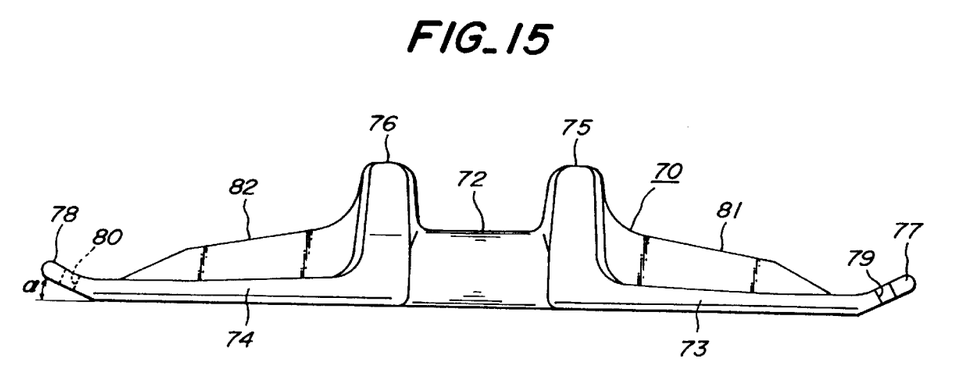
FIG. 15 is a front view of the third embodiment of the metal core.
Figure 16:
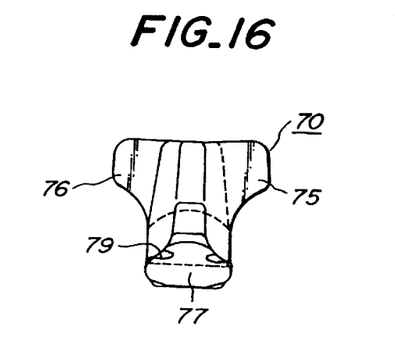
FIG. 16 is a right side view of the third embodiment of the metal core.

A third embodiment (70) of the metal core used in the rubber crawler according to the invention is shown as a plan view in FIG. 13, as a bottom view in FIG. 14, as a front view in FIG. 15 and as a right side view in FIG. 16, respectively.

In the metal core 70, numeral 72 is a portion engaging with a sprocket (not shown) and wing portions 73, 74 are formed on both sides of the sprocket engaging portion 72 and also a pair of projections 75, 76 sandwiching the sprocket engaging portion 72 are arranged in zigzag. Also, bent portions 77, 78 are formed in longitudinal ends of the wing portions 73, 74, respectively. Preferably, the bent portions 77, 78 are formed at a side of directing toward an inner peripheral side of a rubber crawler so as to have an inclination angle α of 20–40° with respect to an outer horizontal face of the metal core 70. Furthermore, each of the bent portions 77, 78 is provided with an outside-inside path 79, 80 communicating an outer surface of the bent portion 77, 78 with an inner surface thereof, in which the path 79 is a notch portion formed in both sides of the bent portion 77 and the path 80 is a through-hole formed in the bent portion 78. Moreover, numerals 81, 82 are ribs formed on the wing portions 73, 74 from the vicinity of the longitudinal end thereof toward the projections 75, 76, respectively.

The bent portion 77, 78 has a length of about 10–25 mm.

Figure 17:
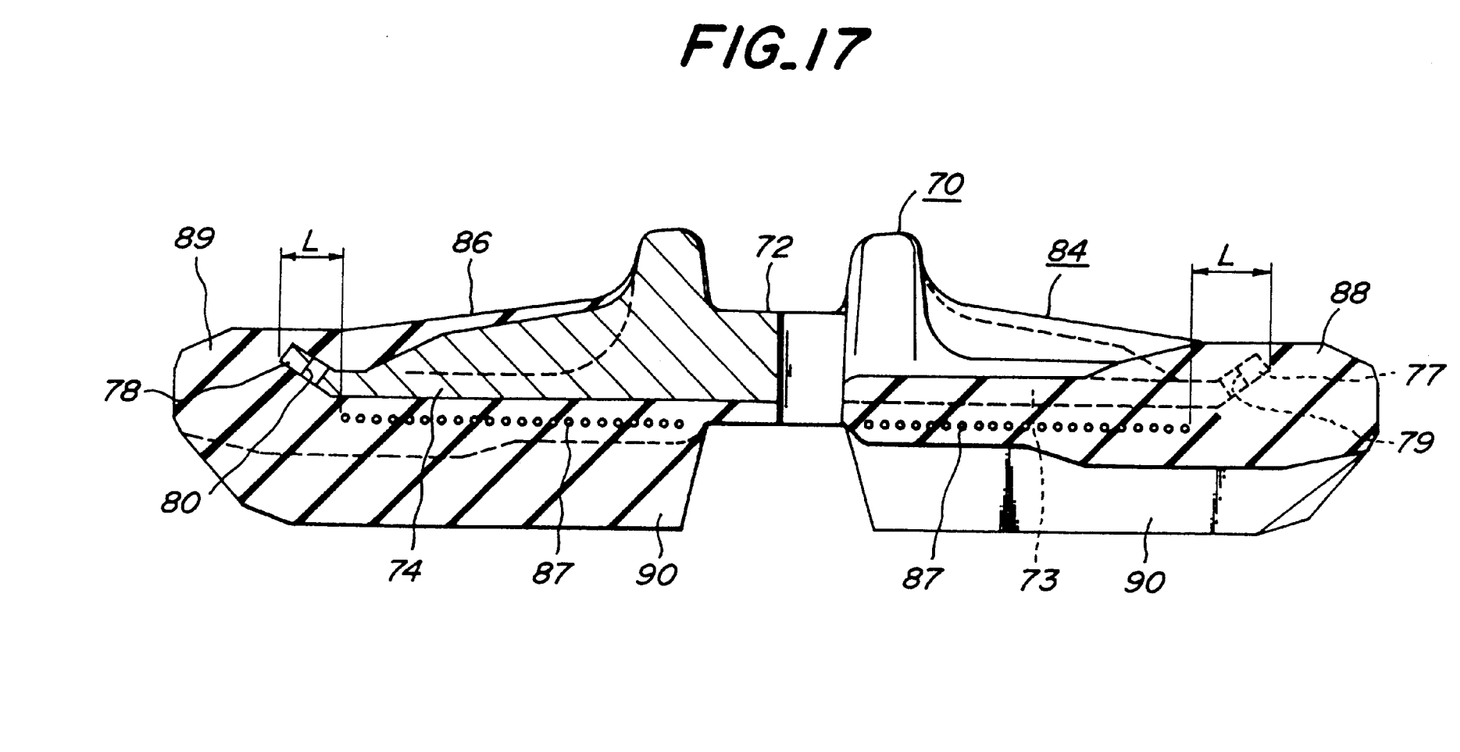
FIG. 17 is a section view of a third embodiment of the rubber crawler according to the invention using the third embodiment of the metal core.

A third embodiment (84) of the rubber crawler according to the invention using the metal core 70 shown in FIGS. 13–16 is shown as a section view in FIG. 17.

In the rubber crawler 84, numeral 86 is an endless rubber elastomer buried with a plurality of the metal cores 70 at a given pitch in the longitudinal direction thereof. A row of steel cords 87 arranged side by side are buried in the rubber elastomer 86 along a bottom surface of the wing portions 73, 74 of the metal core 70 in the longitudinal direction of the rubber elastomer 86. Therefore, widthwise end portions 88, 89 made of only rubber are formed outward from both ends of the metal core 70 in the rubber elastomer 86. Moreover, numeral 90 is a rubber lug formed on the outer peripheral surface of the rubber elastomer 86 at a side of contacting with ground. A sprocket hole (not shown) is defined between the sprocket engaging portions 72 of the adjacent metal cores 70 in which sprocket teeth (not shown) of a driving wheel (not shown) bite in.

As shown in FIG. 17, rubber constituting the widthwise end portions 88, 89 is adhered to the bent portions 77, 78 formed in the longitudinal ends of the metal core 70, so that the adhesion area is widened to increase the adhesion strength. The rubber thickness of the widthwise end portion 88, 89 located outward from the outer surface of the bent portion 77, 78 is thicker than that of the conventionally used crawler. Since the rubber thickness generally contributes to the mitigation of stress in the deformation of rubber, the rubber thickness of the widthwise end portion 88, 89 mitigates the concentration of stress even when the rubber crawler 84 contacts with or rides on a curb of a footpath or the like and hence the occurrence of cracks is not caused.

Furthermore, each of outermost steel cords 87 in the steel cord row is located inward from the longitudinal end of the wing portions 73, 74 of the metal core 70 by a given distance L, so that the same effect as in the first embodiment is obtained. The rubbers of the rubber elastomer 86 located on the outer and inner faces of the bent portion 77, 78 are further connected to each other through the path 79, 80, so that the peeling of rubber from the bent portion is prevented.

Figure 18:
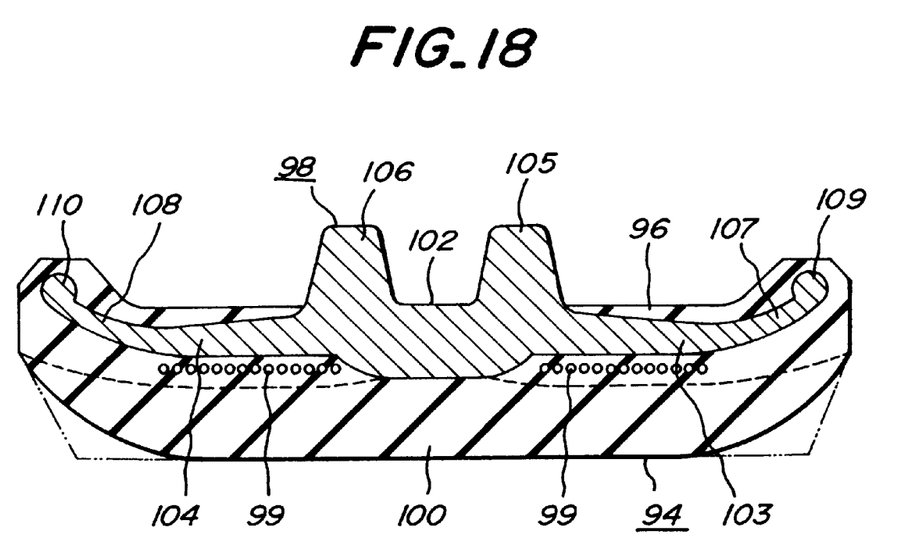
FIG. 18 is a section view of a fourth embodiment of the rubber crawler according to the invention.

As a fourth embodiment of the rubber crawler according to the invention, the rubber crawler 94 is shown in FIG. 18. In this case, the rubber crawler 94 comprises an endless rubber elastomer 96, a plurality of metal cores 98 buried in the rubber elastomer 96 at a given pitch in the longitudinal direction, steel cords 99 arranged side by side in a row and buried in the rubber elastomer 96 along the iuter horizontal face of the metal core 98 in the longitudinal direction of the rubber elastomer 96, and a rubber lug 100 formed on the outer surface of the rubber elastomer 96.

The metal core 98 comprises a sprocket engaging portion 102, a pair of wing portions 103, 104 formed on both sides of the sprocket engaging portion 102, a pair of projections 105, 106 sandwiching the sprocket engaging portion 102, bent portions 107, 108 formed by curvedly bending longitudinal ends of the wing portions 103, 104 so as to direct toward an inner peripheral side of the rubber crawler 94, and rib portions 109, 110 formed in the longitudinal ends of the bent portions 107, 108. Since the bent portion 107, 108 has a curved form, a point of starting an occurrence of strain can be more dispersed inward from the longitudinal end of the metal core to prevent the occurrence of cracks.

In the rubber crawler 94, a sprocket hole is defined between the sprocket engaging portions 102 of the adjacent metal cores 94 in which sprocket teeth (not shown) of a driving wheel (not shown) bite in. Moreover, the rubber thickness in widthwise end portions of the rubber lug 100 may be increased toward the side of contacting with ground as shown by a phantom line.

As mentioned above, in the rubber crawlers according to the invention, a specified means is applied to a widthwise end portion of a metal core buried in a rubber elastomer to prevent the occurrence of crack in the widthwise end portion made of only rubber and the breakage of the widthwise end portion accompanied with the growth of the crack in the longitudinal direction of the rubber elastomer or a direction directing to a ground contact face when the rubber crawler contacts with or rides on protrusions such as pebbles, stone pieces, and the like scattered on a running road or a curb of a footpath, whereby the durable life of the rubber crawler can be considerably improved.

What is claimed is:

1. A rubber crawler comprising: a rubber elastomer constituting a main body of the crawler, at least one metal core buried in the rubber elastomer and extending in a widthwise direction perpendicular to a running direction of the crawler, and at least one rubber lug formed on one outer peripheral face of the rubber elastomer, and a rib having a round sectional shape formed in each widthwise end of the metal core.

2. A rubber crawler comprising: a rubber elastomer constituting a main body of the crawler, at least one metal core buried in the rubber elastomer and extending in a widthwise direction perpendicular to a running direction of the crawler, and at least one rubber lug formed on one outer peripheral face of the rubber elastomer, said metal core having a bent portion oriented toward the inner peripheral side of the crawler and, a ground contact fact of the rubber lug formed in each widthwise end of the metal core and separated from said bent portion of said metal core.

3. A rubber crawler according to claim 2, wherein an inclination angle of the bent portion with respect to an outer horizontal peripheral face of the metal core is 15–45°.

4. A rubber crawler according to claim 3, wherein the inclination angle is 20–35°.

5. A rubber crawler according to claim 2, wherein the bent portion has an outside-inside path as said crawler moves.

6. A rubber crawler according to claim 2, wherein the rubber elastomer is an endless rubber belt, a row of plural steel cords arranged side by side and buried in the rubber elastomer along one outer surface of the metal core said steel cords extending in the circumferential direction of the rubber elastomer and each of outermost steel cords in the steel cord row is located inward from the widthwise end of the metal core by not less than 15 mm.

7. A rubber crawler according to claim 2, wherein a plane surface edge in a widthwise end portion of the rubber elastomer that faces the ground is located outward from the outer surface of the metal core.

* * * * *